9785X

W. AVERY.

STEAM BOILER.

Patented June 28, 1836.

William Avery of Syracuse C.o of Onondaga State of Newyork. 9785X (485) Letters Patent The schedule referred to in these Letters Patent and making part of the same, containing a description in the words of the said William Avery himself of his improvement in the boiler for generating steam.

To all whom it may concern: Be it known, that I William Avery of Syracuse, in the county of Onondaga in the State of Newyork have invented an improved boiler for generating steam for steam engines, and for other purposes, and I do hereby declare that the following is a full and exact description thereof reference being had to the drawings which accompany and make a part of this description —

In describing this boiler, I shall as a guide in its construction, mention such dimensions of the respective parts, as according to my observations are in good proportion to each other, but without intending thereby to limit myself in this particular as it is evident that the absolute size must be governed by the purpose to which it is to be applied and that the proportion of the individual parts to each other will admit of considerable variation whilst the principle of constructing remains unchanged. —

Figure 1:
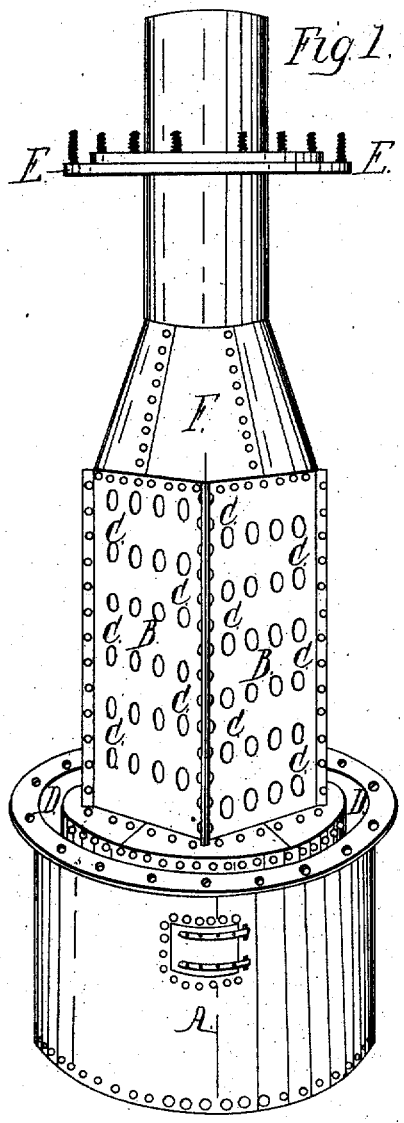
Figure 2:
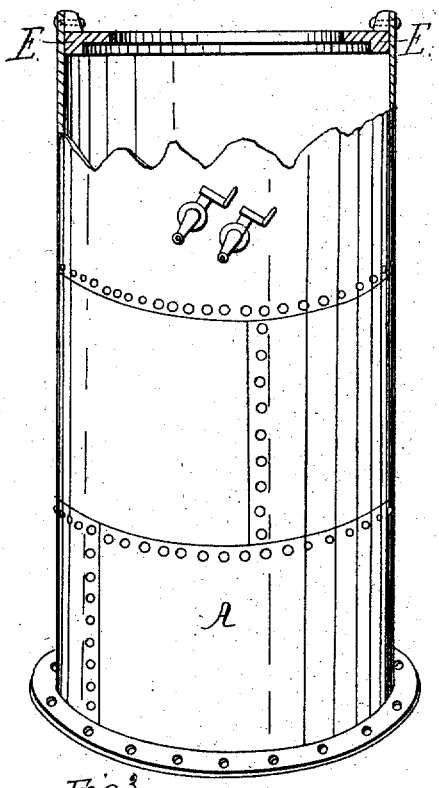

The exterior appearance of the boiler is that of a vertical cylinder A in Fig 1 being the lower portion of the Cylinder upon which the part A, fig 2 is to be placed, the two being united together by bolts and flanches with a gasket interposed. The furnace is contained within A Fig. 1 there being a second or interior Cylinder with a space D. between them, which space is filled with water. The aperture for the feeding door and also that for an ash pit door, are of course so lined through the water space as to connect the outer and inner Cylinders. The inner Cylinder forming the crust or walls of the furnace is surmounted by a part B.B. which is made square immediately above that Cylinder and forms part of the flue, and of the boiler C. C. are the openings of tubes which extend from side

Figure 3:
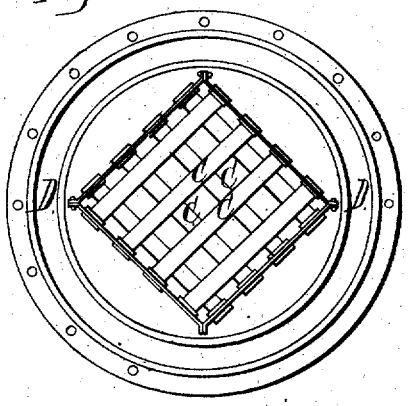

9785X le side of this square the alternate rows of tubes being at right angles to each other as seen at C fig 3.

The part marked F is a continuation of the flue, connecting the square part B with the round chimney and is therefore square at its lower and round at its upper end —

The cylinders A A may be three feet in diameter and eight feet in height, the flanch for fastening them together, two feet from the bottom. The space D between the two Cylinders may be four inches. B B is twenty inches square and three feet high, it is pierced so as to receive in each plate, the ends of twenty four two inch tubes, making in the whole 48 tubes, the holes are at equal distances from each other and the tubes must be firmly fixed by rivetting or otherwise —

The conical part F diminishes at its upper end to a circle of twelve inches diameter E E fig 1 & 2 are flanches by which the upper end of the boiler and the flue are attached together by bolts, a gasket &c: steam and water cocks, a safety Valve and the other usual appendages to a steam boiler are of course employed, but these do not need any description. A boiler, the general construction of which is that above described, offers several advantages over most if not all others — The square portion immediately above the furnace, and which receives the tubes in the way described, will admit of expansion and contraction in such a way as will not tend to loosen the tubes even should the expansion or contraction be from any cause rendered unequal. The water space by the particular construction of the boiler is greatest at the mouth of the tubes where it is most needed, and where the heat is most intense namely on the lower tubes, there will at all times be a presence of at least three feet head of water. Should the water accidentally be allowed to descend below the upper range of tubes, the portion of heat from the furnace which will reach them will not be likely to be productive of Injury —

What I claim therefore as my constituting my invention & improvement is the general construction form and combination

9785X 46 of the respective parts as above described, by which general com-
bination I do not merely intend a verticall boiler with a double
case between which the water to be heated is contained, the furnace
being situated within the inner case and having tubes for heating
water, such boilers having been heretofore constructed, but a dis-
tinguishing characteristic of my boiler is the combination of these
parts with the square portion, which receives the tubes, and which
is marked B in the drawings together with such variations of
which the same is susceptible, whilst the general characteristics by
which it is distinguished remain substantially the same Witnesses
Elam Lynds
Addison R. Gilmore William Avery

[illegible] Drawing [illegible]